United States Patent
Meeker et al.

(10) Patent No.: US 6,799,896 B2
(45) Date of Patent: Oct. 5, 2004

(54) SEPARATOR GREASE RETENTION AND FEED SYSTEM FOR WHEEL SPINDLE BEARINGS

(75) Inventors: Steven E. Meeker, Norwalk, OH (US); Stephen L. Setty, Elmore, OH (US); Todd M. Kroeger, Hamilton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/247,214

(22) Filed: Sep. 19, 2002

(65) Prior Publication Data

US 2004/0057644 A1 Mar. 25, 2004

(51) Int. Cl.[7] .............................................. F16C 33/38
(52) U.S. Cl. ...................................... 384/470; 384/529
(58) Field of Search ................................ 384/529, 470, 384/526, 531, 532

(56) References Cited

U.S. PATENT DOCUMENTS

| | | | | |
|---|---|---|---|---|
| 1,254,332 A | * | 1/1918 | Lindhe | ........................ 384/529 |
| 2,706,137 A | * | 4/1955 | Stricklen | ..................... 384/529 |
| 5,074,679 A | * | 12/1991 | McLarty | ...................... 384/526 |
| 6,408,669 B1 | | 6/2002 | Meeker et al. | |
| 6,485,187 B1 | | 11/2002 | Meeker et al. | |
| 6,574,865 B2 | | 6/2003 | Meeker et al. | |
| 6,575,535 B2 | | 6/2003 | Meeker et al. | |
| 6,622,377 B1 | | 9/2003 | Johnson et al. | |
| 2002/0041719 A1 | * | 4/2002 | Kawakami | ................... 384/470 |

* cited by examiner

*Primary Examiner*—Lenard A. Footland
(74) *Attorney, Agent, or Firm*—Michael D. Smith

(57) ABSTRACT

A separator for a bearing comprising a frame including a plurality of cavities for receiving rolling elements and further including a lubrication channel in fluid communication with at least one of the plurality of cavities. This separator may be a component of a bearing including an inner race, an outer race, and a plurality of rolling elements disposed in each of the plurality of cavities of the separator and set to be in movable contact with the outer race and inner race of the bearing. A lubricant is introduced into the lubrication channel and flows into each of the plurality of cavities which provides evenly distributed lubrication to each rolling element of the bearing assembly.

7 Claims, 4 Drawing Sheets

SEPARATOR GREASE RETENTION AND FEED SYSTEM FOR WHEEL SPINDLE BEARINGS

TECHNICAL FIELD

The present invention relates to rolling-type bearings, and more particularly, to separators for rolling-type bearings.

BACKGROUND OF THE INVENTION

Bearings, such as rolling-type bearings, are used to support the wheels of vehicles, among other uses. Rolling-type bearings, such as ball bearings, are popular because rolling resistance is demonstrably much less than sliding resistance. These bearings, then, are characterized by rolling elements, such as balls or rollers, confined between outer and inner rings, referred to as races. The rolling elements are usually spaced uniformly by a cage, referred to as a separator. The rolling elements are important because they transmit loads from moving parts of a machine to stationary supports.

When balls are used as rolling elements, they may be uniformly spherical. When rollers are used, they may be straight cylinders, or they may be barrel- or cone-shaped, or of other forms, depending upon the purpose of the bearing design. The races supply smooth, hard, accurate surfaces for the balls or rollers to roll on. In certain bearings, there may only be the inner or outer race, and the rollers or balls operate directly upon a suitably hardened shaft or housing. Further, rolling surfaces may be machined in the inner and outer races in order to provide close tolerances of size, surface finish, and roundness between the surfaces and the rolling elements of the bearings. This will provide a smooth rolling surface for the rolling elements. The rolling elements then rotate as a shaft rotates in order to minimize friction and wear on various components of the machine. In many embodiments, lubricants may be introduced to the bearing, and particularly to the rolling elements, to further reduce friction and wear, and in order to prolong the life of the bearing.

The bearing generally includes a bore disposed through the inner race. This bore is adapted such that a shaft may be disposed through the bore and journalled to the bearing. Rotational motion of the shaft may be used to maintain a load-supporting lubricant film between the inner and outer races, which provide annular support surfaces on the inner surfaces of the bearings and the outer surface of the shaft. Rotation of the shaft will draw lubricant into one or more small clearance spaces between the shaft and the load bearing surfaces of the bearings.

Various generations of bearing-style drive and nondrive wheel bearing assemblies that feature separators, for load carrying capabilities and minimum torque/drag performance, are typically faced with difficult methods of properly lubricating and/or greasing the rolling elements of the bearing assembly. This difficulty generally arises because the lubrication of the bearing assembly occurs from outside the bearing assembly after the bearing has been assembled.

In a typical assembly, the rolling elements of the bearing are located in the interior of the bearing housing and a certain distance inward from each end of the bearing housing. Thus, in order to properly lubricate the rolling elements, lubricant must be forced into the separator of the bearing from either one end of the bearing, or by introducing lubricant from each end of the preassembled bearing. Additionally, other bearing components, such as speed sensor rings and/or inner ring components, can provide further physical obstacles which prevent proper positioning of the lubricant in the separator of the bearing. Further, difficulty in lubrication may arise because many bearings may include more than one separator.

Currently, the typical solution to this lubrication problem is to provide a sufficient quantity of lubricant in the bearing assembly in order to ensure that the ball rows will receive some lubrication. This technique is generally referred to as "volume greasing". In this method, first, the free or open space (in volume) between the internal components of the bearing is calculated. Second, a predetermined volume of a lubricant, such as grease, is forced into the bearing in an axial direction. By this method, some of the lubricant will reach the separator of the bearing. However, as described above, much of this lubricant may be blocked from reaching the separator by other components of the bearing.

A second problem with this method of lubrication is that the lubricant may not be evenly distributed radially, in addition to the axial lubrication problem noted above. This can translate into the pushing of a concentrated section of grease, or other lubricant, away from the rolling elements as the rolling elements begin to turn, thus leading to the problems of friction and wear.

A third problem with this lubrication method is higher costs. This method of volume greasing requires an excess of the proper amount of grease required to lubricate the bearing for its normal design life, due to the open volume of a particular bearing design. This excess use of lubricant leads to higher costs of manufacture.

Yet a fourth problem is that the oil bleed, or separation, from this higher volume of grease can build up and be forced out of the bearing assembly through the sealing systems and onto corner brake components. This reduces the amount of lubricant in the bearing and can lead to increased problems with friction and wear.

Thus, in view of the above drawbacks with current methods of lubricating balls and bearings, it would be desirable to provide a separator and bearing assembly which requires less lubricant for proper bearing lubrication, and reduces the cost of bearing manufacture, while providing evenly distributed lubrication to each rolling element of a bearing assembly.

SUMMARY OF THE INVENTION

The present invention reduces and eliminates the drawbacks with current methods of lubricating rolling elements of bearings. The present invention does so by providing a separator for a bearing, which includes a frame for housing the rolling elements, such as balls, of the bearing. This frame includes a plurality of cavities for receiving the rolling elements and further includes a lubrication channel. This lubrication channel is in fluid communication with each of the cavities of the separator. Grease and/or another lubricant may be provided within the channel prior to assembling the separator in the bearing assembly. The lubricant flows through the channel and into each of the cavities in order to lubricate the rolling elements so that they may roll on the surfaces of the races of the bearing with minimal friction and wear. Following insertion of the rolling elements into the cavities of the separator, the lubrication channel is filled with a lubricant, such as grease, and the separator is introduced into a bearing including an outer race and an inner race. Once inserted into the housing of the bearing, the separator is disposed within the outer race and inner race with the plurality of rolling elements disposed between the outer race and inner race and in movable contact with the races.

The lubrication channel design permits the assembly of the rolling elements into the separator, as normal, outside of the bearing assembly. However, the separator subassembly can be transferred to a lubrication station outside of the bearing assembly for introduction of a lubricant into the channel prior to final assembly of the separator into the bearing. At the same time, prior to final assembly, one can simultaneously check for ball presence, evacuate air from the open cavity, and then fill the open cavity with grease or other lubricant. Each "pre-greased" bearing separator subassembly can then be installed into the bearing assembly. This design permits a maximum volume of evenly distributed grease to each rolling element while eliminating the need for volume greasing.

The present invention ensures continued and directed lubrication for the rolling elements of the bearing assembly, thus assuring proper lubrication for the design life of the bearing assembly. Additionally, the lower volume and placement of lubricant in the bearing assembly will reduce bearing manufacturing costs and reduce the probability of lubricant bleed problems as noted above in the Background of the Invention. The lubrication channel design also reduces axial space outside of the rolling elements in the bearing design. The present invention also provides the advantages of allowing for a pre-greased separator subassembly, which can then be provided by component suppliers.

BRIEF DESCRIPTION OF THE DRAWINGS

The present invention will now be described, by way of example, with reference to the accompanying drawings, in which.

DETAILED DESCRIPTION

Figure 1:
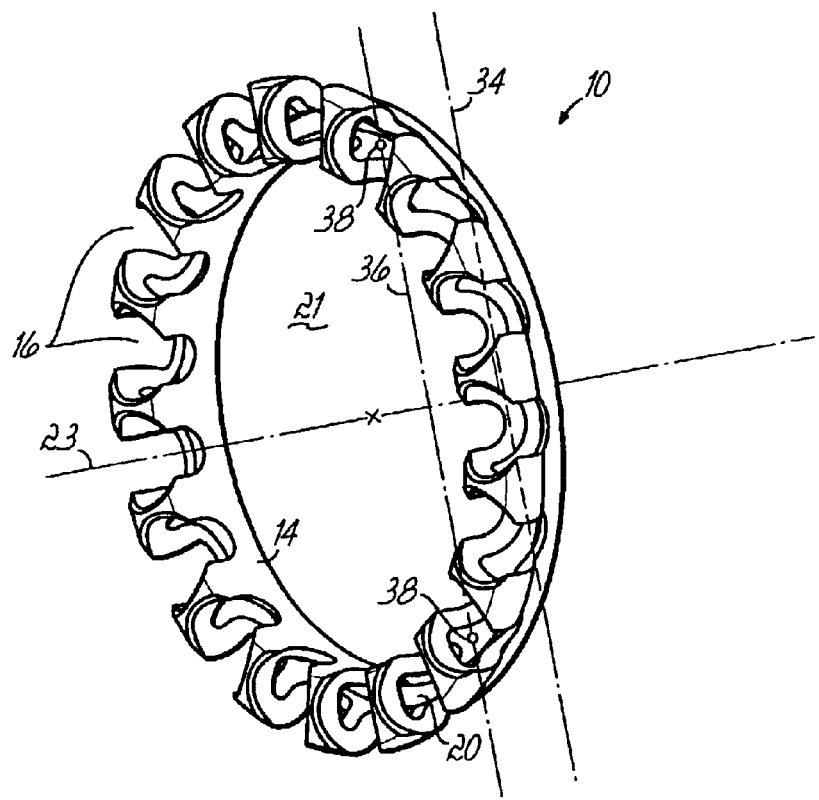
FIG. 1 is a perspective view of the separator of the present invention, depicting the plurality of cavities for receiving rolling elements therein.

Referring to the Figures, one preferred embodiment of the present invention includes a separator 10 to be used as a component of a bearing 12. This separator 10 includes a frame 14 having a plurality of cavities 16 for receiving a plurality of rolling elements 18. This plurality of rolling elements 18 may, as shown in the illustrated embodiment, be ball members for use in a ball bearing. Thus, in the illustrated embodiment, each rolling element would be received by a cavity 16.

The frame 14 of the separator 10 may further include a lubrication channel 20. As can be seen with particular reference to FIGS. 1A, 2, and 2A, this lubrication channel 20 is in fluid communication with at least one of the plurality of cavities 16 disposed in the frame 14. In particular, in one embodiment, the lubrication channel 20 may be in fluid communication with each of the plurality of cavities 16. In the illustrated embodiment of the present invention, this communication between the lubrication channel 20 and the cavities 16 may be provided by the channel 20 being open to each of the cavities 16. While the illustrated embodiment is a separator 10 for use in a ball bearing, it will be recognized and appreciated by those having skill in the art that the separator 10 of the present invention may be used in bearings 12 of types other than ball bearings. Alternatively, the separator 10 of the present invention may be used in various bushings, as will be recognized by those having skill in the art.

Figure 3:
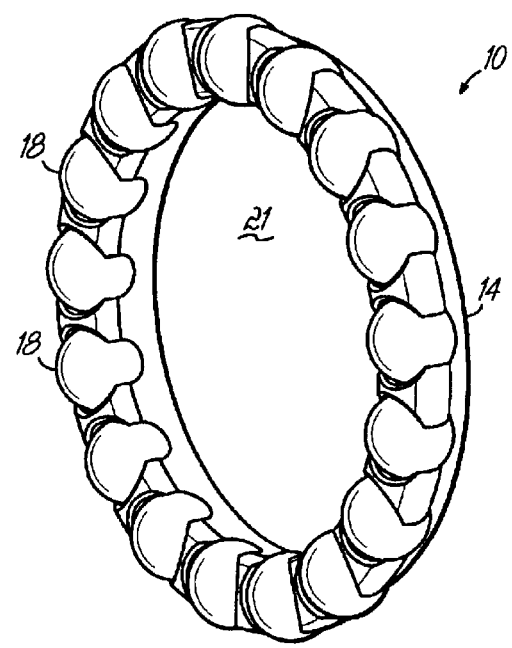
FIG. 3 is a perspective view of the separator of the present invention, depicting the rolling elements inserted in the plurality of cavities of the separator.

Referring now to FIG. 3, a plurality of rolling elements 18 are coupled with the separator. In particular, in the illustrated embodiment, each of the rolling elements 18 is received in one of the plurality of cavities 16. Alternatively, not all of the plurality of cavities 16 are associated with a rolling element 18. For example, rolling elements 18 may be received in every other cavity 16 of the separator 10.

The rolling elements 18 are disposed within the cavities 16 such that they are freely movable within the cavities 16. In the illustrated embodiment, the rolling elements 18 are balls. However, it will be recognized by those of skill in the art, that the rolling elements 18 need not be balls, but may be any other type of rolling element, including, but not limited to, cylinders, barrel-shaped rollers, and cone-shaped rollers.

Figure 1A:
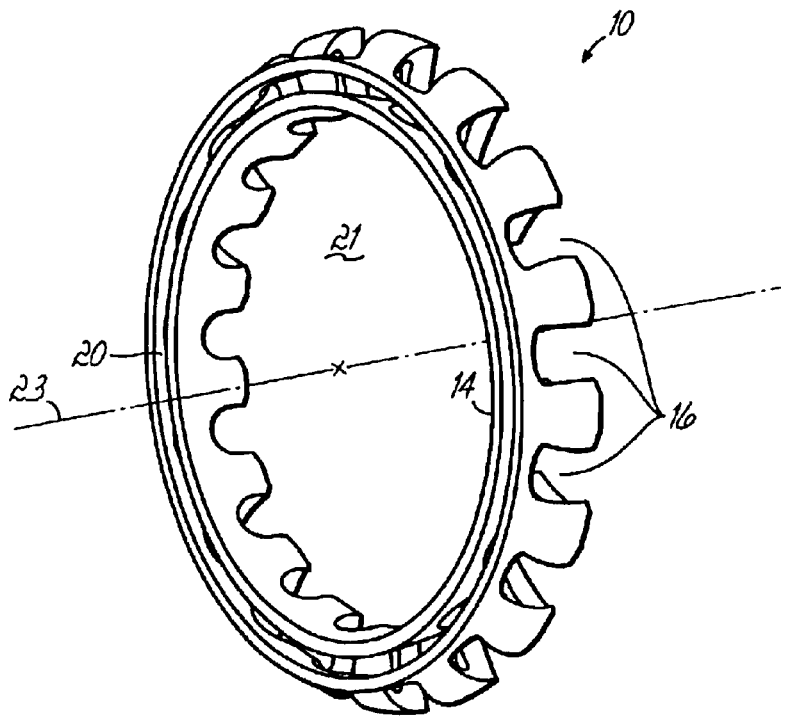
FIG. 1A is a perspective view of the separator of the present invention, depicting the lubrication channel of the separator.
Figure 2:
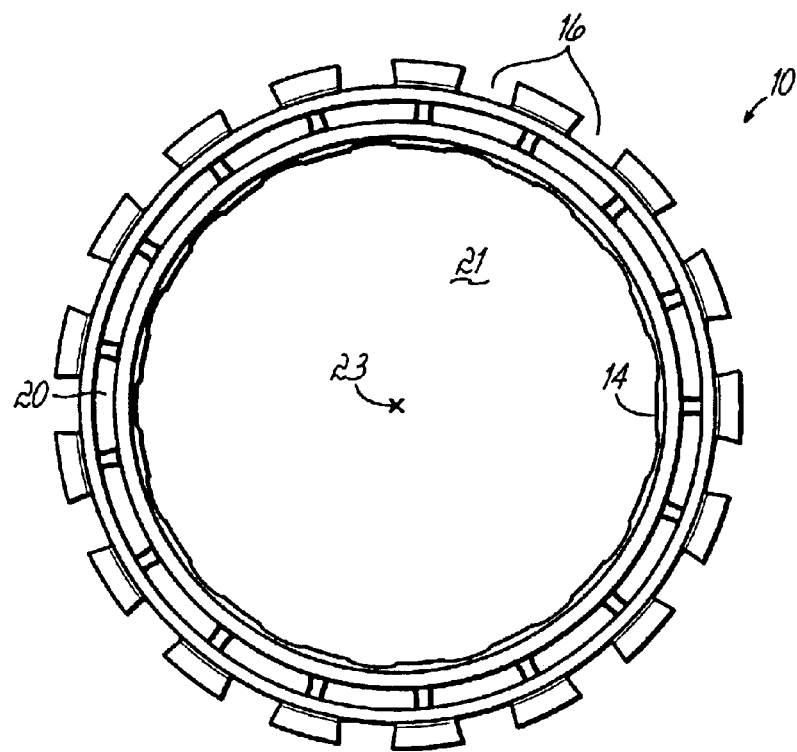
FIG. 2 is a rear view of the separator of the present invention, depicting the lubrication channel of the separator.

With reference to FIGS. 1–3, it will be noted that the frame 14 of the separator 10 of the illustrated embodiment of the present invention is annular. However, it is not necessary that the frame 14 of the separator 10 be annular, but may include other shapes, including, but not limited to, oblong, elliptical, or any other shape which may be found in bearings 12. The frame 14 further includes an orifice 21 extending through the frame 14 and circumferentially about the axis of symmetry 23 of the frame 14. As will be described below, an inner race 26 of a bearing 12 may be disposed within this orifice 21 such that the rolling elements 18 may movably contact the inner race 26. Alternatively, a shaft (44 in FIG. 5), which may be cylindrical, may extend through this orifice 21. The frame 14 further may be composed of any materials common to bearings 12 in the art to which the present invention pertains. These include, but are not limited to, metals and various plastics, such as polyethylenes and polyurethanes.

The lubrication channel 20 of the separator 10 is integral with and radially inward from the frame 14 of the separator 10. The lubrication channel 20 lies within a first plane 34, which is substantially parallel to a second plane 36 passing through respective center points 38 of each of the plurality of cavities 16. This lubrication channel 20 is associated with the frame 14 in such a manner as to not hinder the contact of the rolling elements 18 with the surfaces of an inner race 26 and an outer race 24 of a bearing 12. In an alternate embodiment, this lubrication channel 20 may be a separate component and be subsequently operatively connected to the frame 14, such that the lubrication channel 20 is in fluid communication with at least one of the plurality of cavities 16 of the separator 10. In yet another alternate embodiment, the lubrication channel 20 may be in fluid communication with one of the plurality of cavities 16, with the plurality of cavities 16 being in fluid communication, one to another, by alternate means such that any lubricant 32 in the lubrication channel 20 can ultimately be disposed in each of the plurality of cavities 16. In such an alternate embodiment, the lubrication channel 20 may not necessarily be completely radial about the frame 14, but may be disposed in one or more particular locations about the frame 14.

In the illustrated embodiment, the lubrication channel 20 is open to the exterior of the separator 10 on the side of the frame 14 to which the lubrication channel 20 is disposed. This allows for a lubricant 32, such as grease, to be introduced into the lubrication channel 20 for subsequent introduction into the plurality of cavities 16 of the frame 14. In an alternate embodiment, the channel may be partially closed to the outside of the frame 14 wherein the channel may operate as a closed conduit open only to the plurality of cavities 16. In such an alternate embodiment, the lubrication channel 20 may further include at least one opening to allow a lubricant 32 to be introduced into the channel 20. In yet another alternate embodiment, the separator 10 may include a plurality of lubrication channels 20.

Figure 2A:
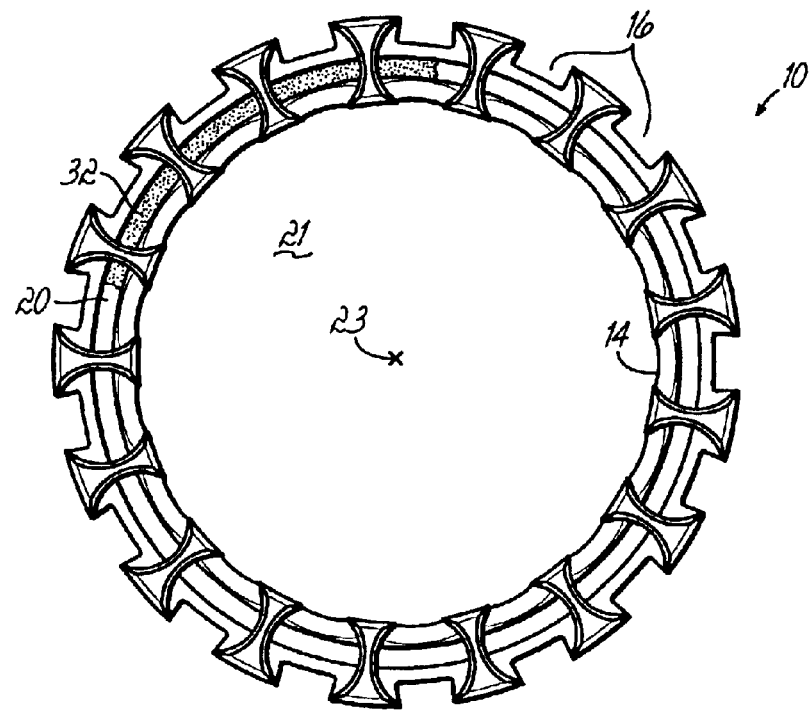
FIG. 2A is a front view of the separator of the present invention, depicting the plurality of the cavities of the separator in fluid communication with the lubrication channel.

A lubricant 32 is contained within the lubrication channel 20 to reduce friction and wear on the bearing 12. While FIG. 2A depicts the lubricant 32 as being in only a portion of the lubrication channel 20, it will be recognized that the lubricant 32 may be disposed throughout the entire lubrication channel 20. Lubricants are generally a gas, liquid, or solid used to prevent contact of parts in relative motion, and thereby reduce friction and wear. As used in the present invention, lubricants may generally be a liquid or a solid. In particular, lubricants may include, but are not limited to, petroleum lubricants, multigrade oils, solid lubricants such as talc, and greases. In one particular embodiment of the present invention, a grease is used as the lubricant. The grease may be solid or semifluid, including thickening and/or gelling agents in a liquid. The grease may include additional ingredients. The grease, as used in the present invention, may have a solid or semisolid nature which enables the grease (1) to remain in the separator, and thus in the bearing 12, without the aid of additional seals, (2) to provide a seal against moisture and dirt, and (3) to remain on moving surfaces.

The gelling agents, as used in greases for the present invention, may include, but are not limited to, fatty acid soaps of lithium, sodium, calcium, and aluminum. The fatty acids used may include, but are not limited to, oleic, palmitic, stearic, and other carboxylic acids. Further, the greases, as used in the present invention, may include thickening agents. These thickening agents may be in the form of high melting solids, including, but not limited to, clays, silica, organic dyes, aromatic amides, and urea derivatives. As described above, the thickening and/or gelling agents may be present in a liquid substrate to form the grease usable as a lubricant in the present invention. In one particular embodiment, synthetic oils may be used as a substrate in the grease. These may include, but are not limited to, silicones, esters, and fluorocarbons.

When grease, or another lubricant 32, is applied to rolling-type bearings 12, as in the present invention, shearing between the inner race 26 and outer race 24 of the bearing 12 and the rolling elements 18 disposed in the separator 10 may be severe. In such an application, when a grease is used as the lubricant 32, it does not soften and run out of the bearing 12. As soon as a freshly lubricated separator 10 is placed into a bearing 12 and the bearing 12 set in motion, a substantial portion of the grease is redistributed through the lubricant 32 channel into the plurality of cavities 16 to contact the rolling elements 18. The grease on the working surfaces of the bearing 12 is quickly broken down into a soft oily material which lubricates these parts, and because it has very low viscosity, develops very little friction.

Figure 5:
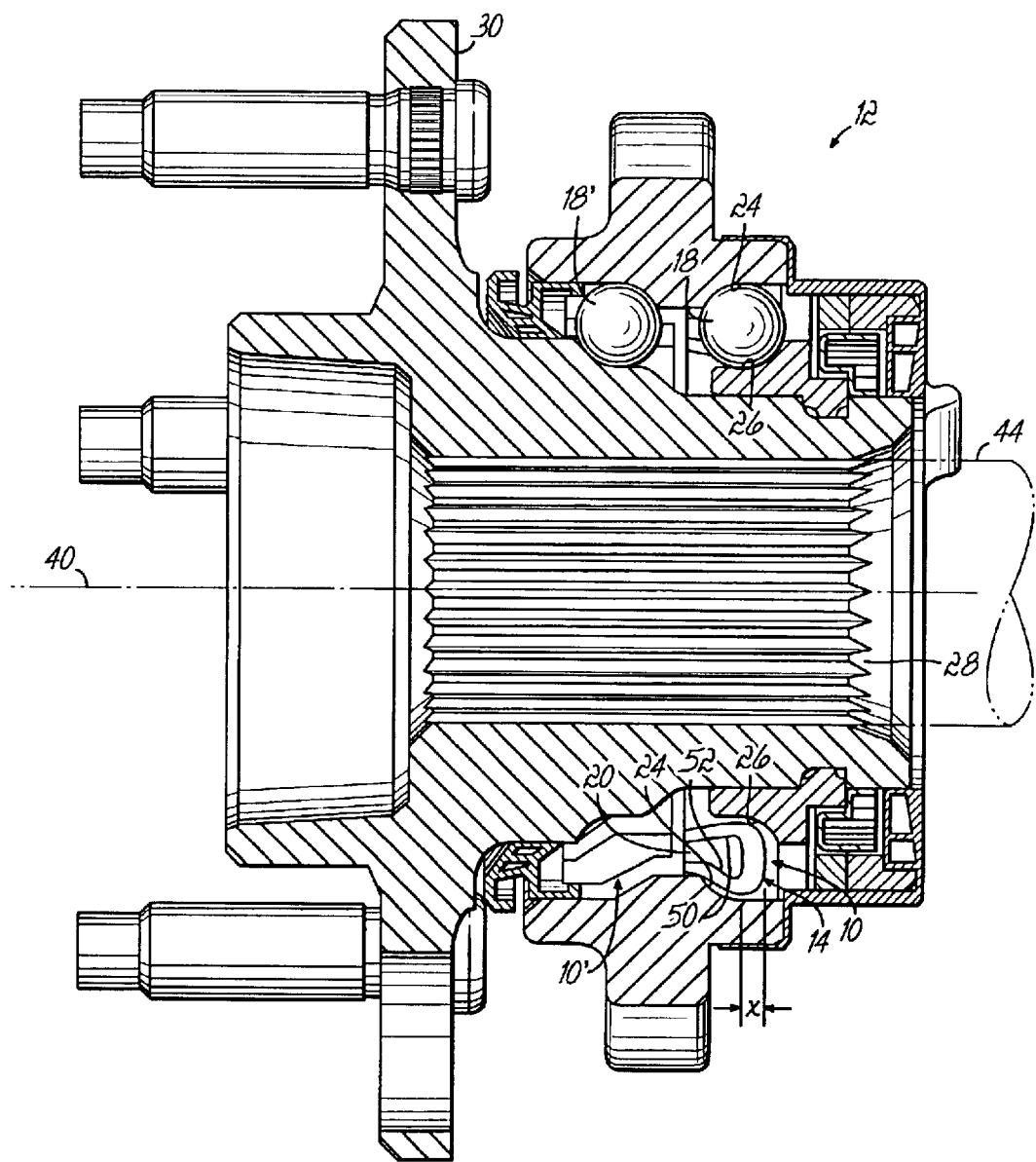
FIG. 5 is a cross-sectional view of the bearing assembly, taken along line 5—5 of FIG. 4.

In the illustrated embodiment of the present invention, the lubrication channel 20 is angled. With reference to FIG. 5, the cross-section of the separator depicts the angled walls 50, 52 of the lubrication channel 20 relative to the axis of symmetry 40. This design of the channel 20 ensures that, due to gravitational force, any lubricant 32 will feed toward the rolling elements 18 and the zones of contact of the rolling elements 18 with the inner and outer races 26, 24.

Another feature of the separator 10 of the present invention, is the design for positioning of the lubrication channel 20 on the inboard side of the separator 10. The illustrated embodiment of FIG. 5 depicts two separators 10, 10' housing rolling elements 18, 18' in a bearing 12. The separator 10', on the left-hand side of FIG. 5, depicts a typical double-sided separator design, whereas the separator 10, on the right-hand side of FIG. 5, depicts the separator 10 of the present invention, having the lubrication channel 20 on the inboard side of the separator 10. This connection permits the separator 10, of the present invention, to exhibit a "dome-type" crown which increases the cross-section thickness ("x" in FIG. 5) over that found in prior separators. This creates a stronger connection between components of the separator 10. This connection further permits the lubrication channel 20 access to the base of the rolling elements 18 for lubrication, evacuation, and fill purposes.

Figure 4:
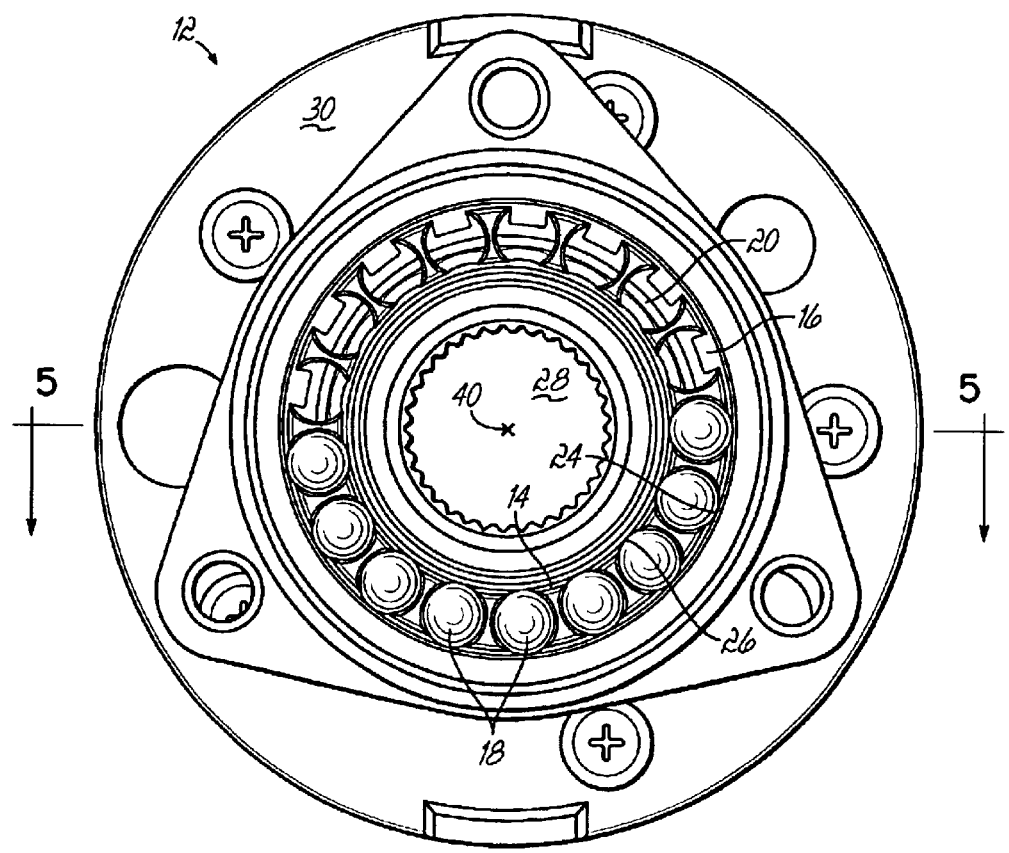
FIG. 4 is a front view of the separator of a bearing assembly including a separator of the present invention, and depicting some rolling elements installed in the cavities, and further depicting some cavities open in order to demonstrate fluid communication of the cavities with the lubrication channel.

Referring now to FIGS. 4 and 5, the separator 10 be used in a bearing 12, such as a roller-type bearing like a ball bearing. Such bearings 12, as known to those with skill in the art, and as described above, include an outer race 24 and an inner race 26. The outer race 24 and inner race 26, in the illustrated embodiment, are substantially annular. In alternate embodiments, the inner race 26 and outer race 24 may be other shapes, including, but not limited to, oblong or elliptical. The outer races 24 and inner races 26 form surfaces for the rolling elements 18 of the bearings 12 of the illustrated embodiment to movably contact.

Thus, the bearing 12 includes a plurality of rolling elements 18, such as ball members, disposed between the outer race 24 and inner race 26 with those ball members being in movable contact with both the outer race 24 and the inner race 26. The inner race 26 further includes a bore 28 extending through the inner race 26 and circumferential about the axis of symmetry 40 of the inner race. A shaft 44 which may be cylindrical, may be disposed through this bore 28.

The separator 10 is thus likewise positioned between the inner race 26 and outer race 24 and includes the plurality of cavities 16, each one housing respective ones of the rolling elements 18. The rolling elements 18 are thus held within the separator 10 and roll against the faces of the outer race 24 and inner race 26. In the illustrated embodiment, the rolling elements 18 are balls. However, it will be recognized by those of skill in the art, that the rolling elements 18 need not be balls, but may be any other type of rolling elements, including, but not limited to, cylinders, barrel-shaped rollers, and cone-shaped rollers. As described above, the lubrication channel 20 is in fluid communication with at least one of the plurality of cavities 16, and a lubricant 32 disposed within that channel 20 lubricates the rolling elements 18 to protect against wear and friction. Further, with reference to FIG. 5, it is seen that more than one separator 10, may be present in the bearing 12.

In use, the present invention further provides a method of lubricating rolling elements 18 of a bearing 12. This method includes the following steps. First, a separator 10 for a bearing 12 is provided. This separator 10, as described above, includes a plurality of cavities 16 for receiving rolling elements 18, and further includes a lubrication channel 20 in fluid communication with at least one of the plurality of cavities 16. A plurality of rolling elements 18 is also provided. Secondly, each of the rolling elements 18 is then inserted into a respective one of each of the plurality of cavities 16 such that one rolling element is disposed in each cavity 16. This is best illustrated in FIGS. 3, 4, and 5 in the illustrated embodiment. Third, a lubricant 32 is provided and introduced into the lubrication channel 20. This lubricant 32 may then flow into each of the plurality of cavities 16 in order to lubricate the bearing 12 and protect against its wear, once the bearing 12 is placed in motion. Prior to introducing lubricant 32 to the lubrication channel 20, the method of use of the present invention may include evacuating air from the lubrication channel 20.

The method of use of the present invention may further include the step of assembling the separator 10, now including the rolling elements 18 of the bearing 12, into the housing 30 of the bearing 12. In the present invention, this occurs after lubricant 32 has been introduced into the lubricating channel. Thus, the lubrication channel 20 design of the present invention permits the assembly of the rolling elements 18 into the separator 10, as would typically be done, outside of the bearing 12. Then the separator 10 subassembly can be transferred to an evacuation and fill station outside of the bearing 12 assembly which may check for the presence of balls in each of the plurality of cavities 16, evacuate air from the lubrication channel 20, and then fill the lubrication channel 20 with a lubricant 32, such as grease. Each of these pre-lubricated bearing separator subassemblies can then be installed into the bearing 12 assembly. Alternatively, the separator 10 may be kept separately such that it may be provided as a replacement for bearings by component suppliers.

Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A separator for a bearing comprising a frame including a first exterior side, a second exterior side substantially opposite said first exterior side, and an intermediate region disposed between said first exterior side and said second exterior side, said frame defining a plurality of cavities configured to support rolling elements and further defining a lubrication channel in fluid communication with at least one of said plurality of cavities;

wherein each of said plurality of cavities is defined by extending a depth into said frame from said first exterior side and terminating at said intermediate region; and wherein said lubrication channel is defined by extending a depth into said frame from said second exterior side and terminating at said intermediate region, and wherein said lubrication channel is in fluid communication with each of said plurality of cavities.

2. The separator of claim 1 wherein said frame is annular.

3. The separator of claim 2 wherein said lubrication channel is radially inward from said frame and lies within a first plane, said first plane being parallel to a second plane passing through respective center points of each said plurality of cavities.

4. A bearing comprising:

an outer race;

an inner race; and a separator member disposed between said inner race and said outer race comprising a frame including a first exterior side, a second exterior side substantially opposite said first exterior side, and an intermediate region disposed between said first exterior side and said second exterior side, said frame defining a plurality of cavities configured to support rolling elements, and further defining a lubrication channel in fluid communication with at least one of said plurality of cavities;

wherein each of said plurality of cavities is defined by extending a depth into said frame from said first exterior side and terminating at said intermediate region; and wherein said lubrication channel is defined by extending a depth into said frame from said second exterior side and terminating at said intermediate region, and wherein said lubrication channel is in fluid communication with each of said plurality of cavities.

5. The bearing of claim 4, wherein said inner race and said outer race are annular.

6. The bearing of claim 5 wherein said frame is annular.

7. The bearing of claim 6, wherein said lubrication channel is radially inward from said frame and lies within a first plane, said first plane being parallel to a second plane passing through respective center points of each of said plurality of cavities.

* * * * *